A. WOLLENSAK.
REEL.
APPLICATION FILED SEPT. 13, 1909.
969,234.
Patented Sept. 6, 1910.
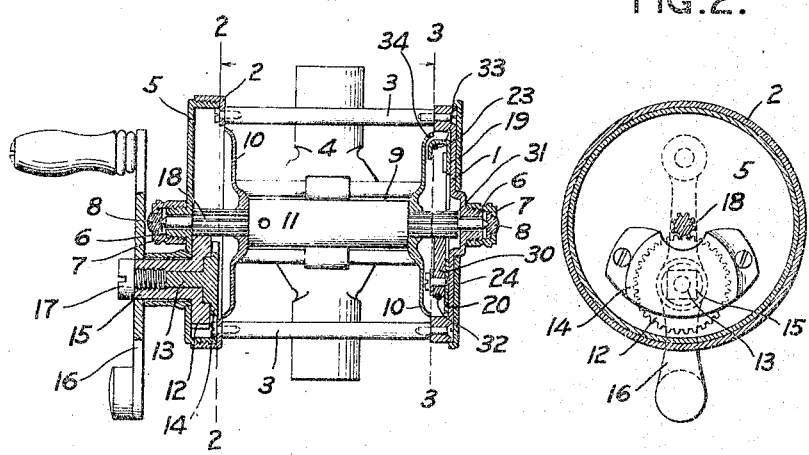
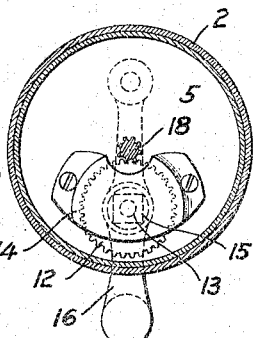
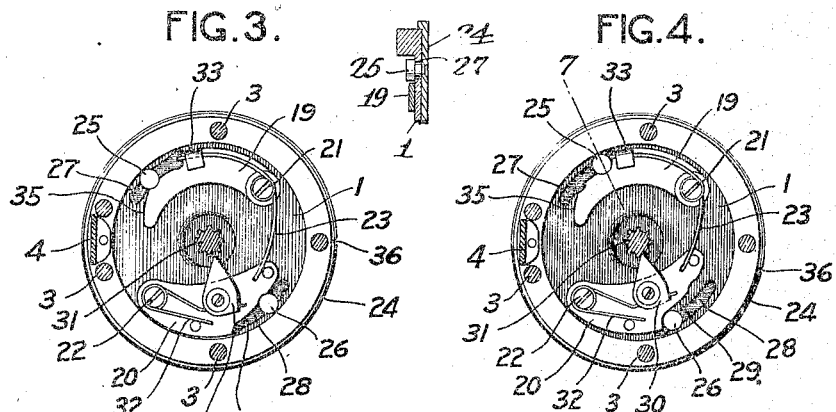
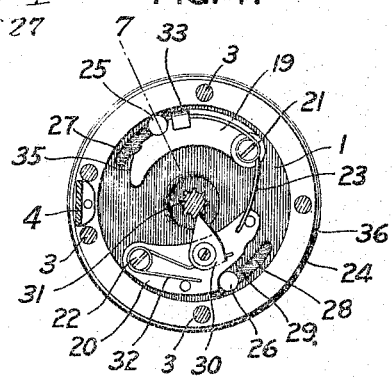
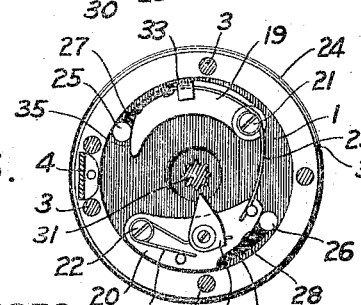
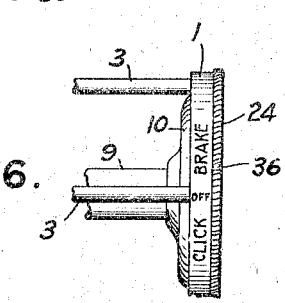
WITNESSES:
INVENTOR:

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

REEL.

969,234.  Specification of Letters Patent.  Patented Sept. 6, 1910.

Application filed September 13, 1909. Serial No. 517,518.

*To all whom it may concern:*

Be it known that I, ANDREW WOLLENSAK, a citizen of the United States, and resident of Rochester, in the county of Monroe and State of New York, have invented certain new and useful Improvements in Reels, of which the following is a specification.

This invention relates to fishing reels, and the object is to provide convenient means for operating the devices commonly provided for retarding its spool, and known as the click and drag.

In the drawings:—Figure 1 is an axial section of the complete reel; Fig. 2 is a transverse section of the frame on the line 2—2 of Fig. 1; Fig. 3 is a section on the line 3—3 of Fig. 1, showing both click and drag in their respective inoperative positions; Fig. 4 is a similar view, showing the click in its operative position and the drag inoperative; Fig. 5 is a similar view showing the drag in operation and the click disengaged; Fig. 6 is a partial elevation of the frame; and Fig. 7 is a detail section on the line 7—7 in Fig. 4.

The frame of the reel comprises a side plate 1 on one side, and an interiorly-threaded ring 2 on the other side, that are rigidly fastened together by a series of rods 3, 3, in the usual manner. A ferrule 4 for attaching the reel to a fishing rod is fixed to a pair of the rods 3.

A disk 5, having an inturned flange is screwed into the threads in the ring 2 and completes the frame. On both the disks 1 and 5 are hollow bosses 6, 6, that carry removable caps 7, 7. The outer ends 8, 8, of these caps are of some hard, smooth material, adapted to constitute frictionless bearings for the axis of the reel-spool 9, while the latter has the usual end flanges 10, 10, and a shaft 11, which has gear teeth on each end outside of said flanges.

The means for rotating the spool 9 are carried by the disk 5, and consist of a gear 12, that is supported on a stud 13 that extends outward from a housing 14. Said gear has a sleeve 15, to which a counter-balanced crank 16 is fastened by a screw 17. The gear 12 is always in mesh with the pinion 18 on the spool shaft 11, and so drives it whenever the crank 16 is turned. The housing 14 is screwed to the disk 5, as shown in Fig. 2.

The devices for controlling when the handle is released are shown in Figs. 3, 4 and 5.

The side plate 1 has on its inner face two levers 19 and 20, that are pivoted, respectively, on studs 21 and 22. A spring 23 that is coiled about the pivot 21, engages both the levers 19 and 20 with its free ends, and tends normally to throw both levers outwardly. A disk 24, having a knurled edge (Fig. 6) is supported on the boss 6 so as to be easily revoluble by hand, and this disk constitutes a manually-operable member for controlling the retarding devices. This disk is not connected with the spool 9, but is held against the end-plate 1 by a pair of studs 25 and 26, that have enlarged heads and extend through slots 27 and 28, respectively, in said end-plate.

As is clearly shown in Figs. 3, 4 and 5, the spring 23 continually presses the levers 19 and 20 against the inwardly projecting studs 25 and 26, respectively, and the outer edges of said levers are of such contour that they may be swung toward the shaft 11 by turning the disk 24 in one direction, and may be allowed to swing away from said shaft, under pressure of the spring 23, by turning the disk 24 in the opposite direction. To this end the lever 20 has an inclined part 29 on its edge that is adapted to be engaged by the stud 26 when the disk 24 is moved to the position shown in Fig. 4, whereby said lever is swung inwardly. This movement brings a pawl 30 that is carried by the lever 19 into engagement with the pinion 31 on the spool-shaft 11, and causes a drag on the spool. This is the "click" retarder that is commonly used in reels. The pawl 30 is flexibly held in the proper position relative to the axis of the pinion 31 by a spring 32 that is coiled around the pivot 22.

When the disk 24 is turned to the position shown in Fig. 5, the studs 25 and 26 are moved out of the way of the levers 19 and 20, so that they can be swung outwardly by the spring 23. When that takes place the pawl 30 is disengaged from the pinion 31. The lever 19 has a lug 33 that is adapted to press against the outer edge of the spool flange 10 at the point indicated by the numeral 34 in Fig. 1, and so operate as a drag upon it. The lever 19 is tapered off at 35 to permit it to swing outward when the stud 25 moves to that point, sufficiently to bring the lug 33 into contact with the flange 10.

When the disk 24 is placed as shown in Fig. 3, the stud 25 holds the lever 19 out of contact with the flange 10, and the spring 23 holds the lever 20 so that the pawl 30 does not touch the pinion 31. Then the spool 9 can revolve freely. The edge of the disk 24 may have a pointer, like the notch 36, for example, that is adapted to coöperate with suitable marks on the periphery of the plate 1 (Fig. 6) to indicate when the click and drag are in operative positions. The advantage of operating these retarding devices by a disk on, and projecting beyond, the side of the reel, is that the free hand of the fisherman finds an operating device of this kind more readily than any other, and when found operates it more easily, and with greater certainty. In bait-casting particularly, when the freely running spool must be checked at the instant when the lure strikes the water, the fisherman, in the moment full of action and excitement, experiences difficulty in locating the device for operating the drag, but in this reel the operating disk 24 is large and fits the hand, and, furthermore, it is located at the very part of the reel that naturally brings it into the palm of whichever hand plays the secondary part of bracing and supporting the other hand with which the rod is manipulated. Again, the location of the indicators on the upper face of the reel makes them instantly visible to the operator, enabling him to set the click or drag, as desired, without the chance of a mistake at a critical moment, while the operating disk 24 offers a large surface for a hand grip and can be operated wherever grasped.

What I claim is:—

1. In a reel, the combination of a frame; a spool revolubly supported thereby; retarding devices for said spool carried by said frame; and a manually-operable rotary disk concentric with the spool, and carrying parts adapted, respectively, to operate one of said retarding devices when said disk is rotated in one direction, and the other retarding device when said disk is rotated in the other direction.

2. In a reel, the combination of a frame; a spool revolubly supported therein; retarding devices for said spool carried by said frame; and a manually-operable disk revolubly supported at one side of and exterior to said frame and having lateral projections adapted, respectively, to operate one of said retarding devices when said disk is rotated in one direction, and the other retarding device when said disk is rotated in the other direction.

ANDREW WOLLENSAK.

Witnesses:
D. GURNEE,
L. THON.